United States Patent [19]

Hjorth-Hansen

[11] Patent Number: 5,649,582

[45] Date of Patent: Jul. 22, 1997

[54] APPARATUS FOR REMOVAL AND MOUNTING OF WHEEL TIRES, PARTICULARLY LARGE TIRES

[76] Inventor: Arne Hjorth-Hansen, Helgasvej 25, Stilling, DK-8660 Skanderborg, Denmark

[21] Appl. No.: 537,781

[22] PCT Filed: Apr. 21, 1994

[86] PCT No.: PCT/DK94/00160

§ 371 Date: Oct. 23, 1995

§ 102(e) Date: Oct. 23, 1995

[87] PCT Pub. No.: WO94/23962

PCT Pub. Date: Oct. 27, 1994

[30] Foreign Application Priority Data

Apr. 21, 1993 [DK] Denmark ................. 0448/93

[51] Int. Cl.$^6$ ........................................... B60C 25/00
[52] U.S. Cl. ........................................... 157/19; 157/1.24
[58] Field of Search ......................... 157/1.17, 1.24, 157/19, 20

[56] References Cited

U.S. PATENT DOCUMENTS

| | | |
|---|---|---|
| 4,293,020 | 10/1981 | Leeper et al. ............ 157/19 X |
| 4,538,660 | 9/1985 | Franco ...................... 157/20 |
| 5,060,708 | 10/1991 | Hansen .................... 157/19 X |
| 5,088,539 | 2/1992 | Mannen et al. ........... 157/20 X |

*Primary Examiner*—James G. Smith
*Attorney, Agent, or Firm*—Antonelli, Terry, Stout & Kraus, LLP

[57] ABSTRACT

An apparatus for handling and working on vehicle tires is disclosed which includes a turnable wheel mounting head and a holder for tools; a base; a wheel holder chassis which is upstanding from the base and which carries a laterally projecting wheel holder spindle and an associated driving system for rotating the spindle with the wheel holder chassis being pivotably connected to the base to tilt between an upright receiving position at which a wheel is directly receivable on the laterally projecting wheel holder spindle and a rearwardly slanting position at which a mounted wheel is raised from the floor to be freely rotatable by the associated driving system; a bead breaking tool mounted on a fixed carrier structure which is shiftable between an inwardly projecting operative position for breaking a tire bead by applying force to tire sides in response to a controlled tilting of the wheel holder chassis and an inoperative position at which the chassis and a wheel mounted on the laterally projecting wheel holder spindle are free to tilt; and a prime mover for tilting the wheel holder chassis and applying the force to the tire sides to break the tire bead.

20 Claims, 2 Drawing Sheets

APPARATUS FOR REMOVAL AND MOUNTING OF WHEEL TIRES, PARTICULARLY LARGE TIRES

BACKGROUND OF THE INVENTION

1. Field of the Invention

The present invention relates to an apparatus for handling vehicle wheels, particularly large tires such as tires for trucks, in order to undertake tire- or tube mendings or changings.

2. Description of the Prior Art

For these works basic different machine operations are used, namely lifting of the wheel to a rotatable position on a power-driven machine spindle, pressure of Dead breaking rollers against tire beads for bead breaking of these from the associated rim flanges while rotating the wheel, and rotating the wheel while using a stationary tire lever, which by the rotation can force the tire bead respectively inside and out over the rim flange. There are no principal problems in providing these apparatus operations, as it is a matter of rather well defined movements, of which is also made use by this invention. However, it is by the invention realized that it is possible to produce the movements in a considerably simplified way and thus bring forward a significant cheapened apparatus of the this kind.

SUMMARY OF THE INVENTION

According to the invention this is achieved by using a wheel holder chassis upstanding from a base plate and having a projecting wheel holder spindle with an associated driving gear, this chassis being tiltable on the base plate between an upstanding receiving position, in which the wheel is directly fastenable to the laterally protruding spindle, and a rearwardly slanting position, in which the mounted wheel will be free of the ground and thus be freely rotatable by means of the spindle drive. The said pressure rollers or corresponding, known pressure discs are reduced to a single roller or disc, which is mounted on a fixed carrier post such that it can be switched between a swung-out parking position, in which it will not obstruct the rearward tilting of the wheel, and a swung-in position in front of the outside of the tire edge or, respectively, behind the rear tire edge. Then the pressing free of the tire beads may be executed by the force of the mechanism tilting the carrier chassis, namely by a forward or a rearward tilting, respectively.

Thus, the required movements may be effected solely with the use of two working mechanisms, viz. for rotating the wheel holder and fur tilting the carrier chassis, respectively. The latter mechanism may in a natural manner consist of a simple working cylinder, but even the rotating can be effected by such a cylinder, viz. by means of a ratchet system designed to turn the wheel holder a whole or only a part of a revolution for each working stroke of the cylinder. Thereby the whole apparatus may be relatively very simple.

The possibility of actuating the apparatus solely by means of two air cylinders will involve that the apparatus may well be installed in or on a service car for working on the roads, which will be a new and very attractive option.

BRIEF DESCRIPTION OF THE DRAWINGS

In the following the invention will be described in more detail with reference to the drawings.

Figure 1:
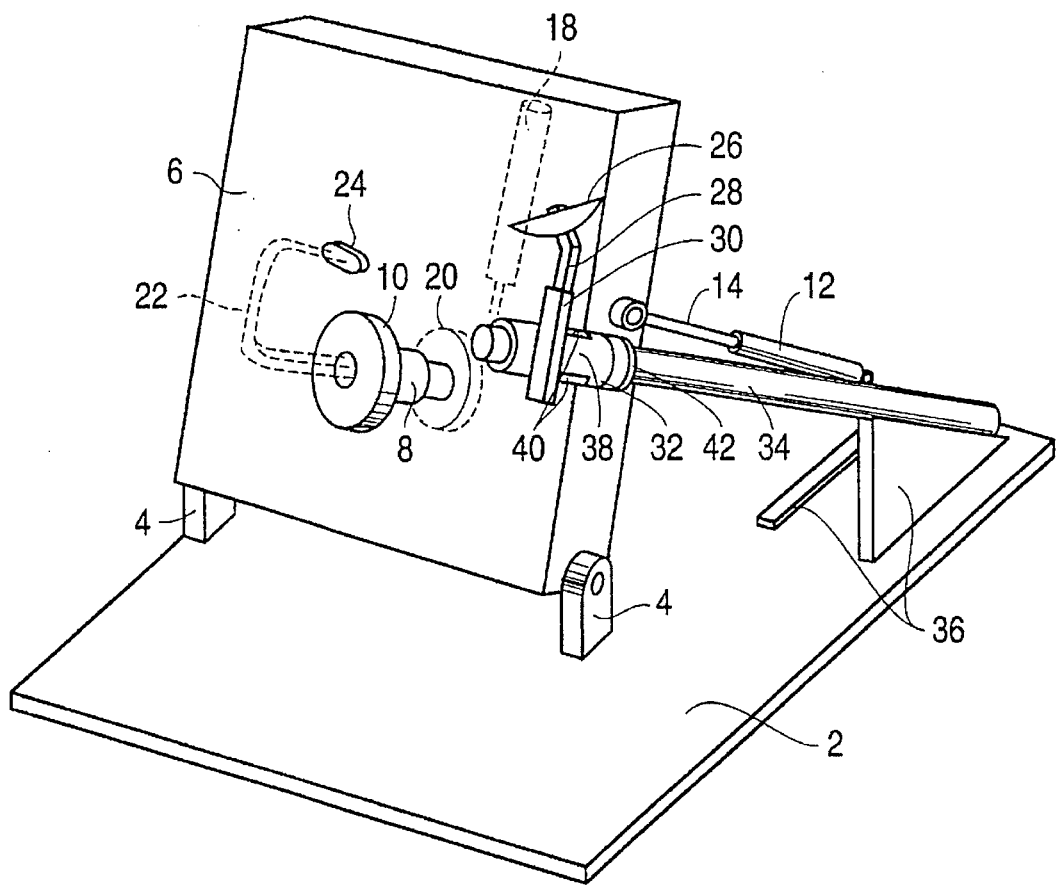
FIG. 1 is a perspective view of an apparatus according to the invention.
Figure 2:
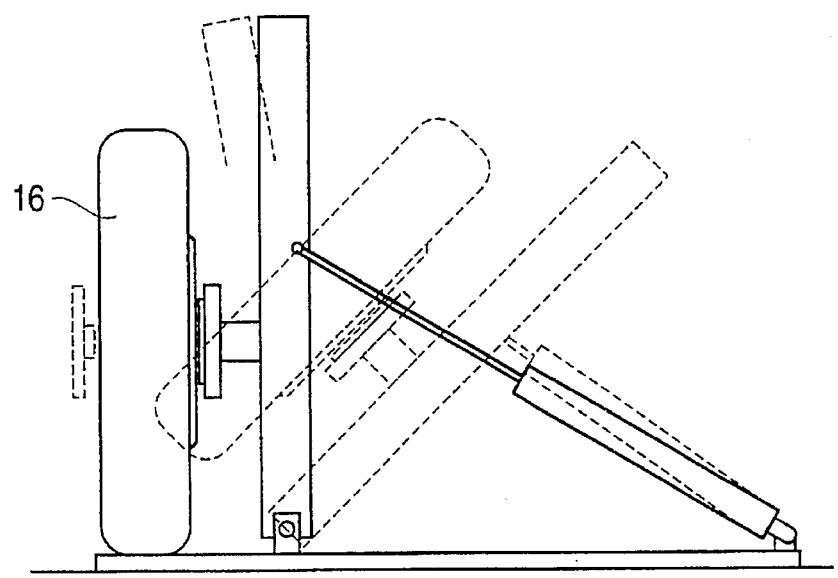
FIG. 2 is a lateral view thereof.

The apparatus shown comprises a base plate 2 having a pair of upright brackets 4, between which there is pivotally mounted an upstanding carrier chassis 6, shaped as a flat box and having a projecting wheel holder spindle 8 as well as means for turning this spindle, the outer end of which is provided with a mounting head operable to receive the wheel =o be worked. The chassis bow 6 is fixed by means of a rear, inclined working cylinder 12, the piston rod 14 of which will determine the degree of slanting of the chassis 6. The slanting range is between a slightly forwardly slanted position and a position slanting some 45° rearwardly. In being pivoted about the vertically upright position of the chassis 6 the wheel spindle 8 may be brought to assumed slightly upwardly and downwardly inclines positions, whereby wheels 16 within a certain diameter range may be mounted easily and in a direct manner in being brought to engage with the wheel holder head lo; thereafter the wheel may follow the chassis 6 when the latter is pivoted rearwardly, namely into a comfortable working position, in which the operator can secure the wheel to the carrier head 10.

For the relevant work the wheel 16 should not be rotated in the sense of being spinned, as for each operation it should only be turned somewhat less than a single revolution, with low speed and a relatively high force. This, of course, may be effected with the use of a gear motor, but it will amount to a cheaper solution to use an air cylinder 18, the piston rod of which drives a ratchet mechanism for turning a cog wheel 20 driving the mounting head 10.

One of the functions to be effected is to heel the tire edge over the wheel rim, either outwardly or inwardly, and this may be done contentionally be means of a tire lever 22 that is inserted into a fixed holder provided inside the wheel spindle S for non-rotational reception therein, the spindle 8 being made as a tube about this holder. An operative end portion 24 of the tire lever will then be located at the rim edge, where the lever can do its job when the wheel is turned. This in itself is well known from other apparatuses of the relevant type.

The apparatus, however, should have further functions, viz. to break the tire edge beads inwardly from the rim sage, i.e. to force the front edge of the tire rearwardly and its rear edge forwardly. Conventionally, this or these pressures are exerted by means of pressure discs, which, at their edges, are pressed against the respective tire edge areas so as to exert the required pressure, while they rotate in accordance with the wheel being rotated. Other kinds of pressure rollers could be used, but even in connection with the invention it is preferred to use the known pressure discs—or rather but a single of them.

As shown in FIG. 1 this single disc, designated 26, is mounted on a slightly staggered end portion of a telescopic arm 28,30, mounted on a carrier body 32, which is adjustable fixed to an end portion of a stationary carrier arm 34, stretching obliquely forwardly and upwardly from a rear edge area of the base plate supported by suitable, fixed support part 26.

In FIG. 1, the disc 26 is shown in a swung-up parking position, in which it is placed entirely outside the periphery of the wheel, such that it will not obstruct the mounting and rearward tilting of the wheel. However, as shove in FIG. 3, the carrier bush 32 can be turned into a position, in which the arm pair 30,28 projects substantially horizontally to a position in front of the wheel, whereby the disc 26 can be brought to assume a position just in front of the outer tire bead.

Now, for producing the required pressing force on the disc for pressing the bead free of the rim, it is sufficient to actuate the cylinder 12 for a slight forward pivoting of the chassis 6; of course, the cylinder 12 should be dimensioned to do this job. When the wheel is then turned, after or in connection with this initial bead breaking, the remaining bead breaking will take place without any change of the position of the chassis 6.

Thereafter the disc 26 can be swung out to the parking position, FIG. 1, and, if appropriate, the tire lever 22 may then be used to heel the outer tire edge outwardly over the rim. Thereafter—or even before that—it may be desirable to break also the rear tire bead from the rim. Conventionally, for this purpose would be used a separate tire disc located inversely, of this disc 26 in its position according to FIG. 3, but in the present connection it could be possible to move the bush 32 on the carrier arm 34 and mount the arm 28 in the carrier tube 30 after having turned it through 180°, whereafter the bead breaking may be effected by a short return tilting of the chassis 6 by means of the cylinder 12 and a following rotation of the wheel.

Figure 4:
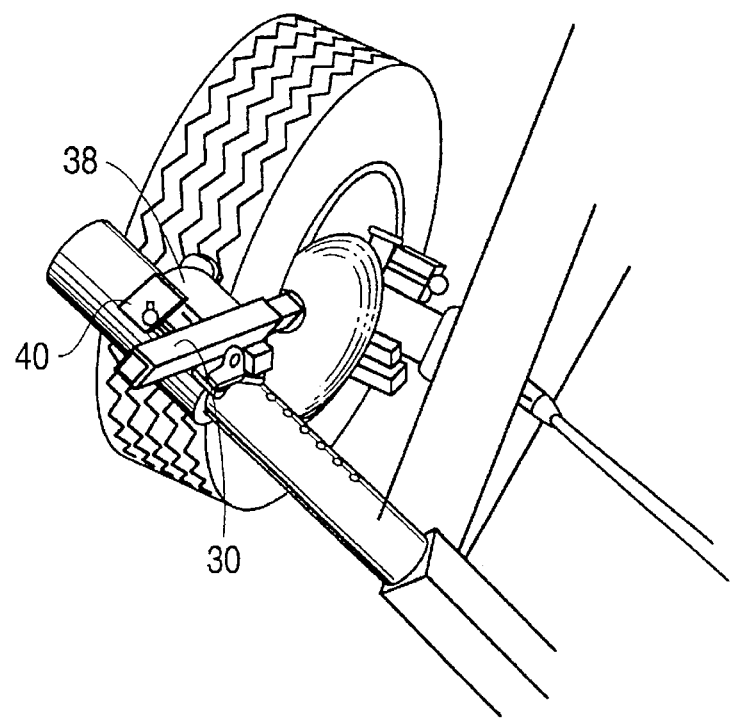

According to the invention, however, it is a preferred arrangement to fix the carrier tube 30 not directly to the bush 32, but to a side arm 38 having its free end pivotally mounted between a pair of brackets 40 fixedly protruding from the bush 32. This side arm 38 will then be pivotable through 180° about a pin shaft between the brackets 40, wherever is possible to swing the entire disc carrier system correspondingly. Such a swinging over may be effected while the system is located in the parking position shown in FIG. 1, and when it is pivoted back therefrom the disc may then be brought into its operative position at the rear side of the wheel, FIG. 4.

When the tire is to be entirely removed it will be suitable to raise the chassis 6 to a still more upright position, when the rear bead of the tire is to be heeled over the foremost edge of the rim.

The bush 32 is mounted in turnable connection with a bush portion 42, which, by means of a rib and groove engagement, is non-rotatably mounted on the arm 34, and which has a spring loaded pawl 44 cooperating with a row of holes 46 in the arm 34, such that the bush 32 is length displaceable on this arm and fixable thereto in different positions. In a preferred arrangement the carrier tube 30 is usable as an operation member for this pawl lock, in that the bush 32 can be turned further than to the parking position and thereby effect a release of the pawl locking, while reestablishing the engagement by a short inward pivoting of the carrier tube 30 upon an axial displacement of the entire bush system 32,42.

Figure 3:
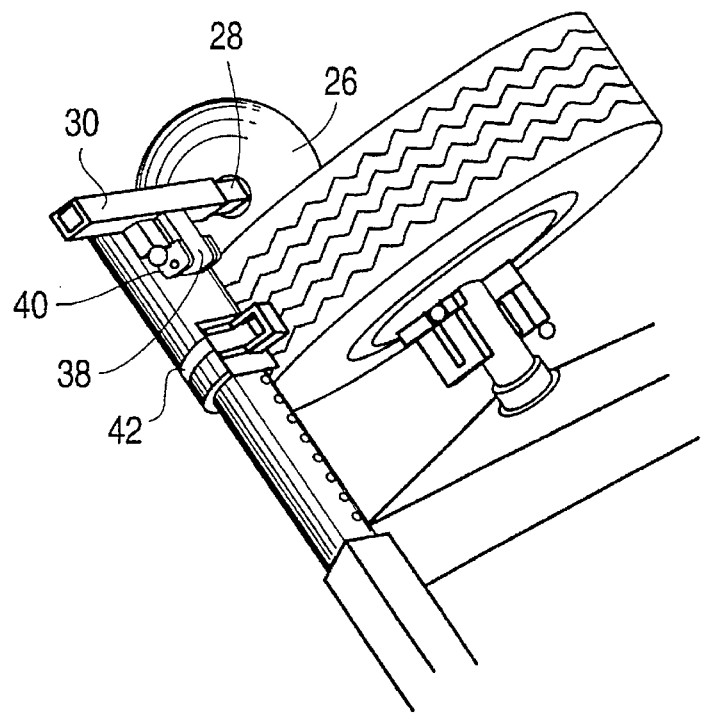
FIGS. 3 and 4 are perspective views of details therein.

FIG. 3 illustrates a particularly advantageous possibility, namely that the pressure disc 26, for the bead breaking of the tire edge at the exterior side, can be initially placed on the tire side somewhat below the horizontal midline of the tyre side. When thereafter the wheel is pushed forwardly the wheel side will concurrently be downwardly displaced, and when the disc is placed as shown this will correspond to the pressure area of the disc being moved along the illustrated dotted line, which, as will be seen, extends through an area inside the rim edge. By this engagement the disc edge has already been pressed inwardly beneath the plane of the rim edge, such that the disc may pass this segment area of the rim unobstructedly, during continued bead breaking, until the disc—relatively—ends up in the position shown by a dotted line.

As far as tubeless tire are concerned, a sufficient bead breaking will be obtained already by this operation, without the wheel having to be turned and without additional means for moving the wheel or the disc. A similar effect is achievable by the bead breaking on the rear side, FIG. 4.

It will be appreciated that all the required functions can be controlled solely by means of two air linders, which makes the apparatus well suited for mobile use in a service van. This, of course, will not imply that the invention should be confined to the use of air cylinders as moving means, since other driving means could be employed.

However, since air cylinders are particularly desirable, it is worth noting that a direct air pressure impact on e.g. a bead breaking disc will have undesirable side effects, while with the invention these effects will be weakened in an advantageous manner in that the affected system will comprise the entire weight of the wheel and chassis 6, i.e. an element which is much heavier than the disc system and thus also has a much higher inertia. Therefore, it will be superfluous to provide for special and traditional measures against undesirably high initial operation impacts.

It should be mentioned that it will be clear that what is really disclosed is guiding of the bead breaking tool along a line which, relatively to the wheel, is a kind of an internal tangent to the rim edge and is moreover slanting inwardly. It is well possible to use a depression depth of 25-30 cm, corresponding to what is conventionally used in connection with more complicated movements for a radially directed introduction of the bead breaking tool under the rim edge, even including a turning of the wheel. Thus, it will be appreciated that the working movement along the said line will be achievable generally by a pure displacement of the bead breaking tool, and that this effect will not in any way be conditioned by the apparatus structure otherwise specified in the present disclosure.

I claim:

1. An apparatus for handling and working on vehicle tires comprising:

a turnable wheel mounting head and a holder for tools;

a base;

a wheel holder chassis which is upstanding from the base and which carries a laterally projecting wheel holder spindle and an associated driving system for rotating the spindle with the wheel holder chassis being pivotably connected to the base to tilt between an upright receiving position at which a wheel is directly receivable on the laterally projecting wheel holder spindle and a rearwardly slanting position at which a mounted wheel is raised from the floor to be freely rotatable by the associated driving system;

a bead breaking tool mounted on a fixed carrier structure which is shiftable between an inwardly projecting operative position for breaking a tire bead by applying force to tire sides in response to a controlled tilting of the wheel holder chassis and an inoperative position at which the chassis and a wheel mounted on the laterally projecting wheel holder spindle are free to tilt; and a prime mover for tilting the wheel holder chassis and applying the force to the tire sides to break the tire bead.

2. An apparatus in accordance with claim 1 wherein:

the bead breaking tool comprises a single pressing member which is mounted on the fixed carrier structure and is movable to engage a front and rear side of the wheel.

3. An apparatus in accordance with claim 1 wherein:

the bead breaking tool is a pressure disc.

4. An apparatus in accordance with claim 2 wherein:

the bead breaking tool is a pressure disc.

5. An apparatus in accordance with claim 1 wherein:

the bead breaking tool is adjustable to assume an operative location relative to the wheel holder chassis so that the tool during tilting of the wheel holder chassis moves relative to one side of the tire along a path passing beneath or inside an edge of a rim of the mounted wheel.

6. An apparatus in accordance with claim 1 wherein:

the prime mover is an air cylinder.

7. An apparatus in accordance with claim 2 wherein:

the prime mover is an air cylinder.

8. An apparatus in accordance with claim 3 wherein:

the prime mover is an air cylinder.

9. An apparatus in accordance with claim 4 wherein:

the prime mover is an air cylinder.

10. An apparatus in accordance with claim 5 wherein:

the prime mover is an air cylinder.

11. An apparatus in accordance with claim 1 wherein:

the driving system is an air cylinder mounted on the wheel holder chassis and includes a ratchet mechanism which drives the wheel holder spindle.

12. An apparatus in accordance with claim 2 wherein:

the driving system is an air cylinder mounted on the wheel holder chassis and includes a ratchet mechanism which drives the wheel holder spindle.

13. An apparatus in accordance with claim 3 wherein:

the driving system is an air cylinder mounted on the wheel holder chassis and includes a ratchet mechanism which drives the wheel holder spindle.

14. An apparatus in accordance with claim 4 wherein:

the driving system is an air cylinder mounted on the wheel holder chassis and includes a ratchet mechanism which drives the wheel holder spindle.

15. An apparatus in accordance with claim 5 wherein:

the driving system is an air cylinder mounted on the wheel holder chassis and includes a ratchet mechanism which drives the wheel holder spindle.

16. An apparatus in accordance with claim 6 wherein:

the driving system is an air cylinder mounted on the wheel holder chassis and includes a ratchet mechanism which drives the wheel holder spindle.

17. An apparatus in accordance with claim 7 wherein:

the driving system is an air cylinder mounted on the wheel holder chassis and includes a ratchet mechanism which drives the wheel holder spindle.

18. An apparatus in accordance with claim 8 wherein:

the driving system is an air cylinder mounted on the wheel holder chassis and includes a ratchet mechanism which drives the wheel holder spindle.

19. An apparatus in accordance with claim 9 wherein:

the driving system is an air cylinder mounted on the wheel holder chassis and includes a ratchet mechanism which drives the wheel holder spindle.

20. An apparatus in accordance with claim 10 wherein:

the driving system is an air cylinder mounted on the wheel holder chassis and includes a ratchet mechanism which drives the wheel holder spindle.

* * * * *